Jan. 6, 1970 R. E. ANDERSON ET AL 3,488,580
TELEPHONE CABLE FAULT LOCATOR EMPLOYING FIRST AND SECOND
POTENTIAL MEANS TO CREATE A SUSTAINED ARCING ACTION
Filed Nov. 17, 1966 2 Sheets-Sheet 1

FIG. I

INVENTORS.
ROBERT E. ANDERSON
PATRICK W. DOLBY
CLARENCE E. BOHNENBLUST
BY Jack M. Wiseman
ATTORNEY INVENTORS.
ROBERT E. ANDERSON
PATRICK W. DOLBY
CLARENCE E. BOHNENBLUST
BY Jack M. Wiener
ATTORNEY United States Patent Office 3,488,580

Patented Jan. 6, 1970

3,488,580

TELEPHONE CABLE FAULT LOCATOR EMPLOYING FIRST AND SECOND POTENTIAL MEANS TO CREATE A SUSTAINED ARCING ACTION

Robert E. Anderson, Sunnyvale, Patrick W. Dolby, Santa Clara, and Clarence E. Bohnenblust, Saratoga, Calif., assignors to Tel-Design, Inc., Mountain View, Calif., a corporation of California Filed Nov. 17, 1966, Ser. No. 595,145
Int. Cl. G01r *31/08*
U.S. Cl. 324—52 16 Claims

ABSTRACT OF THE DISCLOSURE

A device for use in locating cable faults in telephone cable pair lines by producing a sustained arcing action between the cable lines at the location of the fault. A first capacitor is charged to a predetermined potential and a second capacitor is charged to a predetermined potential less than the potential of the first capacitor. The first capacitor is then discharged through the pair of cable lines to produce a sustained arcing action between the cable lines. Upon the potential of the first capacitor being reduced below that of the second capacitor the second capacitor is discharged through the pair of cable lines to produce a high energy action through the sustained arcing action. A voltage sensor is connected between the capacitors to control the operation of the second capacitor.

The present invention relates to telephone repair apparatus and more particularly to apparatus for locating a high resistance fault in telephone cable pair lines. Such faults are generally caused by moisture, water seeping into the cable, factory defects, poor insulation and the like and appear as high resistance between telephone cable pair lines.

In accordance with the present invention, a sustained application of electrical energy is applied to the telephone cable pair lines containing the fault with the result that a sustained arcing action appears across the fault between the telephone cable pair lines. Through this action, a low resistance path, a short, or an open appears at the location of the fault, which is capable of detection by conventional equipment and methods.

The present invention relates in general to apparatus employed for testing faults in cables, and more particularly, to a high resistance fault locator for telephone cables.

It has been found that high resistance faults are caused by damage to the sheath of a telephone cable, which enables moisture and water to seep into the cable, factory defects, poor insulation and the like. As a consequence thereof, a high resistance loop is formed between a pair of cable lines, which is commonly referred to as a high resistance fault. High resistance loop faults in telephone cables cause losses in transmission signals and power. Such high resistance loop faults could have a resistance between a pair of cable lines up to 2 megohms.

Heretofore, high resistance loop faults in telephone cables have been difficult to locate. The difficulty was particularly recognizable when the resistance between a pair of cable lines of such faults were in excess of 10,000 ohms.

Accordingly, an object of the present invention is to provide an improved high resistance fault locator for cables.

Another object of the present invention is to provide a high resistance fault locator for cables, which is particularly adaptable for locating a relatively high loop resistance between a pair of cable lines.

Another object of the present invention is to provide a high resistance fault locator for cables that is suitable for locating relatively high loop resistance faults and yet is relatively safe for use by a repairman.

Another object of the present invention is to provide a high resistance fault locator for cables that provides a sustained high energy action between a pair of cable lines at the location of the high resistance fault.

Another object of the present invention is to provide a high resistance fault locator for cables that provides a sustained high energy action for arcing between a pair of cable lines at the location of the high resistance fault.

Other and further objects and advantages of the present invention will be apparent to one skilled in the art from the following description taken in conjunction with the accompanying drawings, in which.

Figure 1:
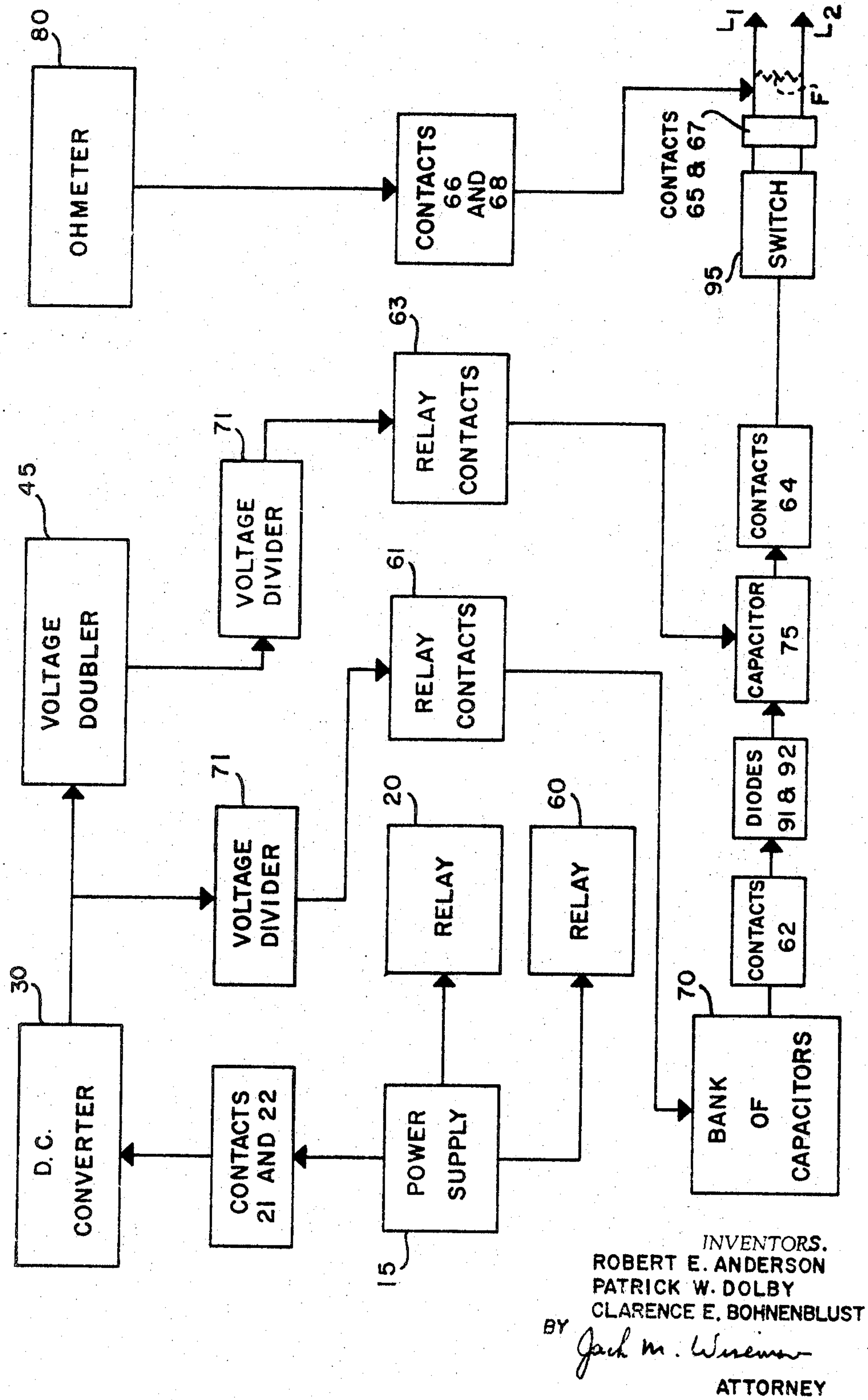
FIG. 1 is a block diagram of the high resistance fault locator of the present invention.
Figure 2:
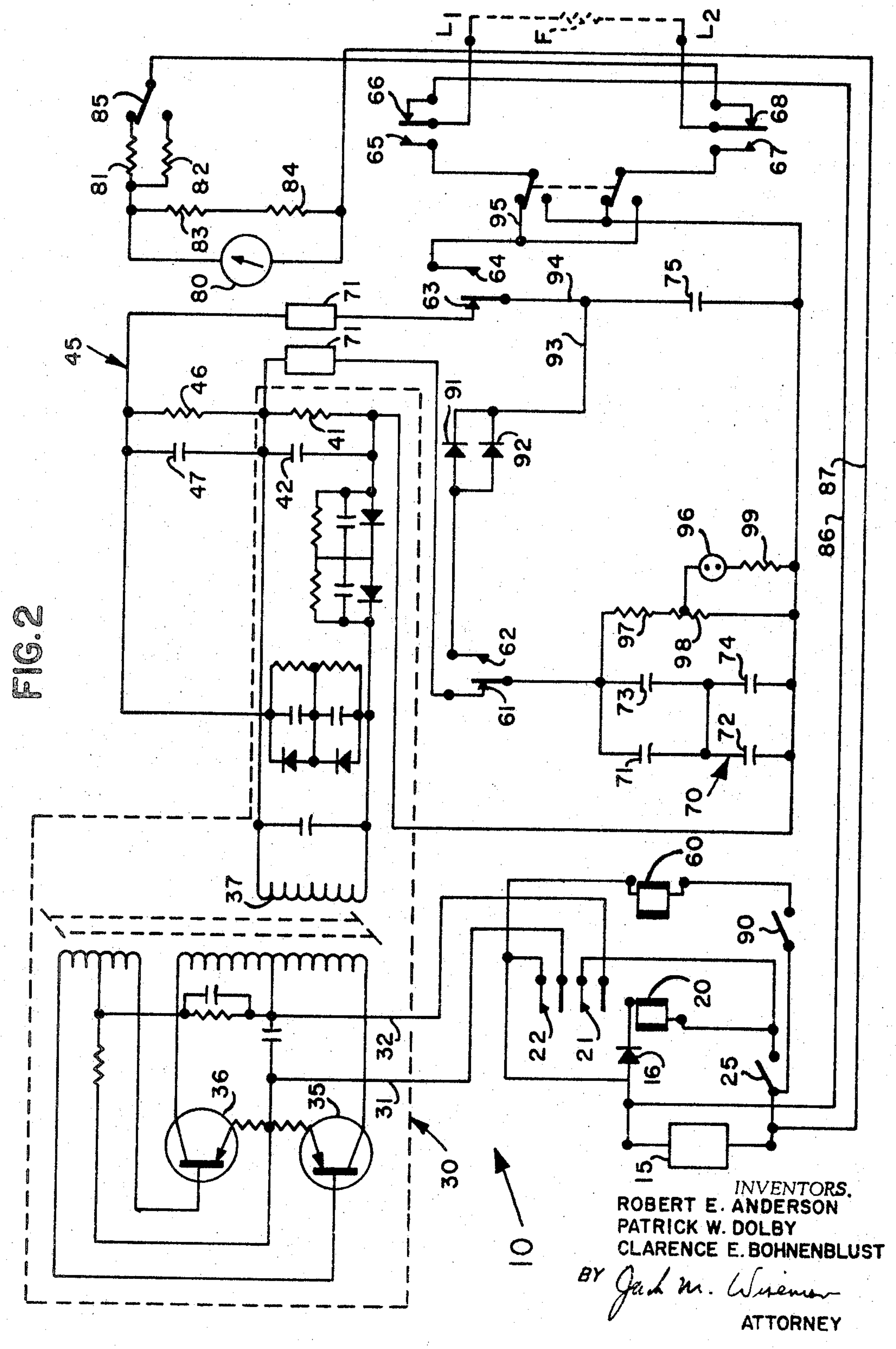
FIG. 2 is a schematic diagram of the high resistance fault locator shown in FIG. 1.

The high resistance fault locator 10 of the present invention serves to apply a sustained high energy arcing action between a pair of cable lines at the location of a high resistance fault. Such sustained arcing action could either correct the high resistance fault or reduce the resistance thereof to a magnitude in which the location of the fault could be detected by a conventional tone and coil method. The sustained arcing action under the just-described condition could also produce a short between the pair of cable lines at the location of the high resistance fault, which short could be detected by a conventional tone and coil method. On the other hand, such a sustained arcing action at the high resistance fault could create an open pair of cable lines at the location of the high resistance fault. The open pair of cable lines located at the high resistance fault is capable of being detected by a conventional and well-known open cable pair locator and method.

Toward this end, the high resistance fault locator 10 comprises a conventional power supply 15. By way of example, the power supply 15 may constitute a 12 volts storage battery, a 12 volts bank of nickel cadmium cells, or a rectifier for converting 110 volts, 60 cycle alternating current into a 12 volts direct current output. Connected across the power supply 15 is a suitable diode 16, a relay 20, and an on-off switch 25. The diode 16 provides protection against transients and reverse polarity. When the switch 25 is closed, the relay 20 is energized through the power supply 15.

Connected across the power supply 15 through the contacts 21 and 22 of the relay 20 and the switch 25 is a conventional and well-known D.C. power converter 30. When the relay 20 is energized, the contacts 21 and 22 close to connect the D.C. converter 30 directly to the power supply 15 over the following path: conductor 31, contacts 22, power supply 15, switch 25, contacts 21 and conductor 32.

The D.C. power converter 30 comprises power transistors 35 and 36 and a transformer 37. Through the circuit connections between the power transistors 35 and 36 and the primary windings of the transformer 37, a regenerative switching action is present between the power transistors 35 and 36. In the secondary winding of the transformer 37 is induced a suitable voltage signal. The voltage signal of the secondary winding of the transformer 37 is rectified by a rectifying circuit 40 of the D.C. power converter 30. In the exemplary embodiment, the D.C. voltage produced across an output circuit of the converter 30, which comprises a resistor 41 and a capacitor 42, is 600 volts.

A well-known voltage doubler circuit 45 is connected to the D.C. power converter 30. The voltage doubler circuit 45 comprises a resistor 46 and a capacitor 47. In the output of the voltage doubler circuit 45 taken from the resistor 46 and the capacitor 47, in the exemplary embodiment, is produced a voltage of 1200 volts.

Connected to the output of the converter 30 through normally closed contacts 61 of a relay 60 is a bank of capacitors 70. The bank of capacitors 70 comprises, in the preferred embodiment, a group of four 2500 mf. capacitors 71–74. When the relay 60 is de-energized, the contacts 61 are closed and the bank of capacitors 70 is charged from the output of the D.C. converter 30. Since the output of the D.C. power converter 30 is 600 volts, in the exemplary embodiment, the bank of capacitors 70 will be charged to 600 volts. It is within the contemplation of the present invention to employ a conventional voltage divider 71 should it be desired to limit the voltage on the bank of capacitors 70 to a magnitude less than the output of the converter 30. Also, it is within the contemplation of the present invention to employ a switching arrangement for adding or removing capacitors to the bank of capacitors 70.

A capacitor 75 is connected to the output of the voltage doubler circuit 45 through normally closed contacts 63 of the relay 60. In the exemplary emobdiment, the capacitors 75 is a 3 mf. capacitor. When the relay 60 is de-energized, the contacts 63 are closed to charge the capacitor 75 from the output of the voltage doubler circuit 45. Since the output voltage of the voltage doubler circuit 45 is 1200 volts, in the preferred embodiment, the capacitor 75 will be charged to 1200 volts. The capacitor 75 may also be incorporated in a bank of capacitors with a switching arrangement for adding or removing capacitors of the bank of capacitors. A voltage divider may also be employed similar to the voltage divider 71 to limit the voltage on the capacitor 75.

While the relay 60 is de-energized, an ohmmeter 80 is connected across cable pair telephone lines $L_1$ and $L_2$ over the following path: ohmmeter 80, range resistor 81 or 82, switch 85, contacts 68, line $L_2$, line $L_1$, contacts 66, conductor 86, power supply 15, conductor 87 and ohmmeter 80. The ohmmeter 80 is operated, when the contacts 66 and 68 of the relay 60 are closed, for testing the cable pair lines $L_1$ and $L_2$ for faults. The switch 85 is employed to connect either the resistor 81 or the resistor 82 to the operating circuit of the ohmmeter 80 depending upon the selected range of operation for the ohmmeter 80.

The relay 60 is energized when a switch 90 is closed. The energizing circuit for the relay 60 is across the power supply 15. Interposed between the bank of capacitors 70 and the capacitor 75 through the normally open contacts 62 are parallel connected diodes 91 and 92. When the contacts 62 are closed, the stored charge on the capacitors 71–74 of the bank of capacitors 70 discharges through the diodes 91 and 92 over a path including conductors 93 and 94 in a manner to be described hereinafter. The discharge path for the capacitor 75 is over the conductor 94.

The diodes 91 and 92 are reversed bias so that the potential on the capacitor 75, when in excess of 600 volts, holds the bank of capacitors 70 charged until the capacitor 75 discharges to a potential below 600 volts. After the capacitor 75 discharges to a potential magnitude less than the stored charge on the capacitors 71–74 of the bank of capacitors 70, then the capacitors 71–74 will discharge through the now forward bias diodes 91 and 92.

A manually operated reversing switch 95 interconnects the normally open contacts 64 of the relay 60 with the normally open contacts 65 and 67 of the relay 60. The switch 95 serves to reverse the polarity of the potential applied to the lines $L_1$ and $L_2$ of the cable under test.

When the relay 60 is energized by the closing of the switch 90, contacts 66 and 68 break to disconnect the voltmeter 80 from the pair of cable lines $L_1$ and $L_2$; contacts 65 and 67 close to complete electrical paths from the contacts 64 through the reversing switch 95 to the pair of cable lines $L_1$ and $L_2$; contacts 63 and 61 break to disconnect the capacitor 75 and the bank of capacitors 70 from their respective charging circuits; contacts 64 close to complete a discharge path for the capacitor 75 over the lines $L_1$ and $L_2$ through the switch 95 and the contacts 65 and 67. The closing of the contacts 62 prepares a discharge path for the bank of capacitors 70 through the contacts 62, diodes 91 and 92, conductor 93, conductor 94, contacts 64, switch 95, contacts 65 and 67, and over the lines $L_1$ and $L_2$. The bank of capacitors 70 does not discharge until the potential on the capacitor 75 has been reduced to a predetermined magnitude, such as less than 600 volts. As previously described, the diodes 91 and 92 are reverse biased so that the bank of capacitors 70 retains the potential thereon of a predetermined magnitude, such as 600 volts, until the potential on the capacitor 75 is reduced to a predetermined magnitude, such as less than 600 volts.

A suitable indicator 96, such as a neon light shows the operator whether a charge is present on the bank of capacitors 70. Associated with the neon light 96 is a voltage divider network comprising resistors 97–99. A voltmeter could be employed in lieu of the neon light 96.

In the operation of the high resistance fault detector 10, the switches 25 and 90 are initially opened. An operator first closes the switch 25 to energize the relay 20. Upon the energization of the relay 20, contacts 21 and 22 close to connect the D.C. power converter 30 across the power supply 15. As a consequence thereof, a predetermined voltage appears in the output of the D.C. converter circuit 30 across the resistor 41 and capacitor 42. In the exemplary embodiment, the potential appearing across the output of the D.C. converter circuit 30 is 600 volts D.C. Simultaneously, a preselected voltage appears across the voltage doubler circuit 45 taken from the resistor 46. In the exemplary embodiment, the potential appearing across the output of the voltage doubler circuit 45 is 1200 volts D.C.

Thereupon, the bank of capacitors 70 is charged through the contacts 61 to a potential equal to the output of the D.C. converter circuit 30. Should a reduced voltage charge on the bank of capacitors 70 be desired, the voltage divider circuit 71 is adjusted for regulating the charge on the bank of capacitors 70. Concurrently, the capacitor 75 is charged through the contacts 63 to a potential equal to the output of the voltage doubler circuit 45, which in the exemplary embodiment is 1200 volts.

The operator, at this time, operates the ohmmeter 80 to observe the fault characteristics of the pair of cable lines $L_1$ and $L_2$. Should the operator observe a high resistance fault, such as high resistance fault F, the operator closes the switch 90 to energize the relay 60. The energization of the relay 60 opens contacts 61, 63, 66 and 68, and closes contacts 62, 64, 65 and 67.

The opening of the contacts 61 opens the charging circuit for the bank of capacitors 70 and the opening of contacts 63 opens the charging circuit for the capacitor 75. The opening of the contacts 66 and 68 removes the ohmmeter 80 from the pair of cable lines $L_1$ and $L_2$. The closing of contacts 65 and 67 switches the pair of cable lines $L_1$ and $L_2$ to the switch 95 and thereby prepares a discharge circuit from the capacitor 75 and the bank of capacitors 70 to the pair of cable lines $L_1$ and $L_2$. The closing of the contacts 64 completes a discharge path from the capacitor 75 to the pair of cable lines $L_1$ and $L_2$ through the switch 95 and the contacts 65 and 67. Also, the closing of the contacts 64 prepares a discharge path from the bank of capacitors 70 to the pair of cable lines $L_1$ and $L_2$. The closing of contacts 62 also prepares the discharge circuit from the bank of capacitors 70 to the pair of cable lines $L_1$ and $L_2$.

At this time, the charge stored on the capacitor 75 discharges through the pair of cable lines $L_1$ and $L_2$ over the path previously described for starting a primary arc or high energy pulse at the fault F. In so doing, a sustained arc is created across the lines $L_1$ and $L_2$ at the fault F. When the potential on the capacitor 75 is reduced to a magnitude below the magnitude of the potential on the bank of capacitors 70, the bank of capacitors 70 then discharges over the pair of cable lines $L_1$ and $L_2$ in the following manner: contacts 62, diodes 91 and 92, conductor 93, conductor 94, contacts 64, switch 95, contacts 65, line $L_1$, line $L_2$, contacts 67, switch 95 and the bank of capacitors 70. Thus, the secondary charge stored on the bank of capacitors 70 discharges through the pair of cable lines $L_1$ and $L_2$ through the sustained arcing at the fault F created by the capacitor 75. The resistance through the arc at the fault F is somewhat lower than the fault resistance. As a consequence thereof, there is a rapid high energy action at the pair of cable lines $L_1$ and $L_2$ through the fault F. Such a rapid high energy action at the fault F reduces the fault resistance to a wire loop resistance or short, or in the alternative the high energy pulse breaks down the resistance leak at the fault F to open the pair of cable lines.

The operator now releases the switch 90 to open the energizing circuit for the relay 60. Thereupon, the relay 60 is de-energized. The de-energization of the relay 60 breaks the contacts 72 to open the discharge path for the bank of capacitors 70 to the cable lines $L_1$ and $L_2$. Simultaneously, the contacts 64 break to open the discharge path for the capacitor 75 to the cable lines $L_1$ and $L_2$. The contacts 65 and 67 also break to further open the path for the discharge of the potential across the cable lines $L_1$ and $L_2$. The closing of the contacts 61 completes a charging path for the bank of capacitors 70 in a manner previously described. Likewise, the closing of the contacts 63 completes a charging path for the capacitor 75 in a manner previously described. The closing of the contacts 66 and 68 once again connects the ohmmeter 80 to the pair of cable lines $L_1$ and $L_2$. The operator operates again the ohmmeter 80 to determine whether or not the fault F now appears as an open, a short or a low resistance path.

In the event the fault F fails to weld or open, the reversing switch 95 is actuated. Should there be a residual voltage at the fault F from the first arcing action, then such residual voltage will be in phase with the subsequent discharge from the capacitor 75 and the bank of capacitors 70. This action overcomes induced D.C. voltage on the pair of cable lines $L_1$ and $L_2$ by reversing the polarity of the breakdown pulse. The above steps are repeated until the fault F appears as an open, a short or sufficient reduced resistance so that normal and conventional testing methods may be applied.

While the arc is sustained, the resistance across the fault F is drastically lower. While the resistance across the fault F is lowered, the heavy charge from the bank of capacitors 70 into the arc across the fault F created by the discharge of the capacitor 75 has considerably lowered the resistance of the fault F. This action causes the fault to break down. At the breakdown, the fault F is either welded together to form a short or is completely vaporized to form an open circuit. The welded action could form a reduced resistance path.

It is to be understood that modifications and variations of the embodiments of the invention disclosed herein, may be resorted to without departing from the spirit of the invention and the scope of the appended claims.

Having thus described our invention, what we claim as new and desired to protect by Letters Patent is:

1. A device for use in the location of a cable fault comprising conductors for establishing connections with cable lines, first potential means connected to said conductors for applying a first potential having an initial predetermined magnitude between the cable lines at the location of a fault, second potential means connected to said conductors for applying a second potential having an initial predetermined magnitude less than the initial predetermined magnitude of said first potential between cable lines at the location of the fault, and voltage sensing means connected to said first and second potential means for controlling the operation of said second potential means to apply the second potential through said voltage sensing means between the cable lines at the location of the fault after the application of the first potential between the cable lines in response to the first potential being reduced below the initial predetermined magnitude of said second potential to produce a sustained arcing action between the cable lines at the location of the fault.

2. A device as claim in claim 1 wherein said first potential means comprises a capacitor and said second potential means comprises a capacitor.

3. A device as claimed in claim 1 wherein said voltage sensing means comprises a reversed bias diode.

4. A device as claimed in claim 1 and comprising a polarity reversing switch connected to said conductors.

5. A device as claimed in claim 1, and comprising a D.C. power converter circuit connected to said second potential means for charging said second potential means to the predetermined voltage, and a voltage doubler circuit connected to said converter and said first potential means for charging said first potential means to the predetermined voltage.

6. A device as claimed in claim 5 and comprising a polarity reversing switch connected to said conductor.

7. A device as claimed in claim 1 and comprising a meter, and means connecting said meter to said conductors while said first and second potential means charge and disconnect said meter from said conductors while said first and second potential means discharge.

8. A device as claimed in claim 1 wherein said arcing action between the cable lines at the location of the fault is a high energy arcing action.

9. A device as claimed in claim 1 wherein said arcing action between the cable lines at the location of the fault either reduces the resistance between cable lines at the location of the fault, or produces a short between cable lines at the location of the fault, or produces an open cable line at the location of the fault.

10. A device as claimed in claim 1 wherein said first potential means produces a sustained arcing action between the cable lines at the location of the fault and said second potential means produces a rapid high energy action through the sustained arcing action between the cable lines at the location of the fault.

11. A device as claimed in claim 10 wherein said sustained arcing action and said rapid high energy action reduce the resistance between cable lines at the location of the fault, produce a short between cable lines at the location of the fault, or produce an open cable line at the location of the fault.

12. A device as claimed in claim 1 wherein said arcing action either welds the cable lines at the location of the fault or vaporizes the cable lines at the location of the fault.

13. A device as claimed in claim 12 wherein the welding of the cable lines at the location of the fault reduces the resistance of the fault or forms a short at the location of the fault and wherein the vaporizing of the cable lines at the location of the fault produces an open cable line at the location of the fault.

14. A device as claimed in claim 1 and comprising switching means for at times connecting said first and second potential means to said charging circuit means and at other times connecting said first and second potential means to said conductors.

15. A device for use in the location of a cable fault comprising conductors for establishing connections with cable lines, first potential means connected to said conductors for applying a first potential between the cable lines at the location of a fault, second potential means connected to said conductors for applying a second potential between cable lines at the location of the fault, means connected to said first and second potential means for controlling the operation of said second potential means to apply the second potential between the cable lines at the location of the fault after the application of the first potential between the cable lines at the location of the fault to produce an arcing action between the cable lines at the location of the fault, said first potential means comprises a capacitor and said second potential means comprises a capacitor, circuit means for charging said first potential means to a predetermined voltage and for charging said second potential means to a predetermined voltage, said predetermined voltage on said first potential means being greater in magnitude than said predetermined voltage on said second potential means, said second potential means discharges through said means connected to said first and second potential means after said first potential means discharges to a predetermined potential magnitude, a D.C. power converter circuit connected to said second potential means for charging said second potential means to a predetermined voltage, a voltage doubler circuit connected to said converter and said first potential means for charging said first potential means to the predetermined voltage, a meter, and relay means for connecting said meter to said conductors which completing a charge path between said converter and said second potential means and completing a charge path between said voltage doubler circuit and said first potential means, said relay means being operative to disconnect said meter from said conductor while establishing discharge paths between said conductors and said first and second potential means.

16. A device for use in the location of a cable fault comprising conductors for establishing connections with cable lines, first potential means connected to said conductors for applying a first potential between the cable lines at the location of a fault, second potential means connected to said conductors for applying a second potential between cable lines at the location of the fault, means connected to said first and second potential means for controlling the operation of said potential means to apply the second potential between the cable lines at the location of the fault after the application of the first potential between the cable lines at the location of the fault to produce an arcing action between the cable lines at the location of the fault, said first potential means comprises a capacitor and said second potential means comprises a capacitor, circuit means for charging said first potential means to a predetermined voltage and for charging said second potential means to a predetermined voltage, said predetermined voltage on said first potential means being greater in magnitude than said predetermined voltage on said second potential means, said second potential means discharges through said means connected to said first and second potential means after said first potential means discharges to a predetermined potential magnitude, a D.C. power converter circuit connected to said second potential for charging said second potential means to a predetermined voltage, a voltage doubler circuit connected to said converter and said first potential means for charging said first potential means to the predetermined voltage, a polarity reversing switch connected to said conductors, a meter, and relay means for connecting said meter to said conductors while disconnecting said reversing switch from said conductors and while completing a charge path between said converter and said second potential means and while completing a charge path between said voltage doubler circuit and said first potential means, said relay means being operative to disconnect said meter from said conductors while connecting said reversing switch to said conductors and while establishing discharge paths between said conductors and said first and second potential means.

References Cited

UNITED STATES PATENTS

| | | | |
|---|---|---|---|
| 2,294,863 | 9/1942 | Hadfield. | |
| 2,306,783 | 12/1942 | Hall | 324—52 |
| 2,499,759 | 3/1950 | Kempf | 324—52 |
| 2,565,307 | 8/1951 | Harding et al. | 324—52 |
| 2,615,076 | 10/1952 | Miller | 324—52 |
| 2,651,752 | 9/1953 | Devot | 324—52 |
| 2,707,267 | 4/1955 | Gavin | 324—52 |
| 3,051,906 | 8/1962 | Haynes | 235—197 XR |
| 3,248,646 | 4/1966 | Brazee | 324—52 |
| 3,274,489 | 9/1966 | Behr | 324—52 |
| 3,286,128 | 11/1966 | Ward | 320—1 XR |

GERARD R. STRECKER, Primary Examiner

U.S. Cl. X.R.

179—175.3; 320—1